United States Patent
Chupick

[11] 3,767,001
[45] Oct. 23, 1973

[54] VEHICLE BODY COMPARTMENT PANEL MOUNTING ARRANGEMENT
[75] Inventor: Ronald Chupick, Warren, Mich.
[73] Assignee: General Electric Corporation, Detroit, Mich.
[22] Filed: Sept. 20, 1971
[21] Appl. No.: 182,005

[52] U.S. Cl................ 180/69 C, 16/128.1, 16/163, 296/76
[51] Int. Cl............................................ B62d 25/10
[58] Field of Search............ 180/69; 296/76, 137 F, 296/137 B; 16/128.1, 163

[56] References Cited
UNITED STATES PATENTS
2,193,111   3/1940   Peterson...................... 180/69 C X
3,487,887   1/1970   Pensa.............................. 180/69 C
2,235,496   3/1941   Greig............................... 180/69 C FOREIGN PATENTS OR APPLICATIONS
622,046   4/1949   Great Britain.................... 180/69 C
1,065,436   1/1954   France............................. 180/69 C Primary Examiner—Leo Friaglia
Assistant Examiner—Milton L. Smith
Attorney—W. E. Finken et al.

[57] ABSTRACT

A mounting arrangement for a vehicle body compartment panel includes a vehicle body mounted channel member receiving a panel mounted roller to slidably support one end of the panel adjacent one end of an opening to a compartment of the vehicle body, and a gooseneck link with first and second ends respectively pivoted to the vehicle body and the other end of the panel adjacent the other end of the compartment opening. A helical spring extends between the vehicle body and the link and moves overcenter of the pivotal axis of the first link end to selectively and alternately bias the link about this axis to either a first or second position, while the channel member and roller cooperate with the link during movement between these positions to support the panel for generally translatory movement between closed and partially open positions relative to the compartment opening. The pivotal axis of the second link end to the panel is located above the adjacent confines of the vehicle body when the panel is in the particlaly open position and the roller is located adjacent an open end of the channel member, allowing the main portion of the panel to pivot upwardly about this axis to a fully open position while a portion of the panel on the opposite side of this axis pivots downwardly. During translation of the panel from the partially open position to the closed position, vehicle body and panel mounted locking elements are slidingly engaged to prevent upward opening movement of the panel and a conventional latch mechanism selectively engages the panel to prevent translation back toward the partially open position.

4 Claims, 3 Drawing Figures

PATENTED OCT 23 1973　　　　　　　　　　　　　　3,767,001

INVENTOR.
Ronald Chupick
BY
Herbert Furman
ATTORNEY

VEHICLE BODY COMPARTMENT PANEL MOUNTING ARRANGEMENT

BACKGROUND OF THE INVENTION

This invention relates generally to mounting arrangements for vehicle body compartment panels and, more particularly, to such mounting arrangements that support the panels for generally translatory movement between closed and partially open positions relative to compartment openings and for generally pivotal movement between the partially open positions and fully open positions.

It is known to provide a mounting arrangement supporting a vehicle body compartment panel for generally horizontal translatory movement from a closed position to a partially open position relative to a compartment opening of the vehicle body and for upward pivotal movement from the partially open position to a fully open position about an axis passing through the confines of the vehicle body. The translatory movement of the panel from the partially open position to the closed position is useful in that it allows sliding engagement of panel and vehicle body mounted locking element to prevent upward opening movement of the closed panel in a direction generally normal to the plane of translation. The pivotal panel movement form the partially open position to the fully open position is limited in certain of these mounting arrangements by the vehicle body geometrical restraints. During pivotal movement of the panel to the fully open position in one type of such a mounting arrangement, the main portion of the panel moves upwardly about the pivotal axis and out of the vehicle body confines while a portion of the panel on the opposite side of the pivotal axis moves downwardly. Since this downwardly moving panel portion will necessarily limit opening movement upon engagement with a fixed member of the vehicle body or will limit the usable space of the compartment if it moves downwardly through the compartment opening, the prior art teaches the concept of positioning the pivotal axis to pass through the vehicle body confines adjacent the end of the vehicle body. This positioning allows the downwardly moving panel portion to essentially tip over the end of the vehicle body. The panel thus necessarily limits access to the end of the vehicle body when positioned in the fully open position. If this pivotal axis were located above the adjacent confines of the vehicle body, the downwardly moving portion of the panel during opening panel movement would be unobstructed and would not necessarily have to tip over the end of the vehicle body.

SUMMARY OF THE INVENTION

This invention provides a mounting arrangement that slidably mounts one end of a vehicle body compartment panel adjacent one end of a compartment opening and includes a linkage extending between the vehicle body and the other panel end and movable between first and second positions to translate the panel between a closed position and a partially open position from which the main portion of the panel is pivotable upwardly to a fully open position about an axis located above the adjacent confines of the vehicle body.

In the preferred embodiment of the invention, the mounting arrangement includes a channel member mounted by and extending longitudinally of the vehicle body adjacent the one end of the compartment opening and a panel mounted roller received by the channel member to slidably support the one panel end. Adjacent the other end of the compartment opening, a goose-neck link has one end pivoted to the vehicle body and a second end pivoted to the other panel end. A spring extends between the vehicle body and the link to selectively and alternately bias the link about the one end to either a first or second position, while the roller and channel member cooperate with the link during movement between these positions to support the panel for generally translatory movement between the closed position and the partially open position where the second link end and the adjacent portion of the panel are located above the adjacent confines of the vehicle body. The roller is positioned adjacent an open end of the channel member with the panel in the partially open position and moves out of the channel member as the main portion of the panel pivots upwardly about the second link end to the fully open position and a portion of the panel on the opposite side of the second link end pivots downwardly. During translation of the panel from the partially open position to the closed position, body and panel mounted locking elements are slidingly engaged to prevent upward opening movement of the closed panel in a direction generally normal to the plane of translation. A conventional latch mechanism between the panel and the vehicle body selectively maintains the panel in the closed position against translatory movement toward the partially open position.

Accordingly, one feature of this invention is that it provides an improved mounting arrangement for a vehicle body compartment panel with one end slidably mounted relative to a compartment opening and with a linkage extending between the vehicle body and the other panel end and movable between first and second positions to support the panel for generally translatory movement between a closed position and a partially open position from which the panel is pivotable about an axis located above the adjacent confines of the vehicle body to a fully open position. Another feature of this invention is that the linkage includes a gooseneck link whose ends are respectively pivoted to the vehicle body and the other panel end and which is selectively and alternately biased about the pivotal axis to the vehicle body to either the first or second position. Another feature of this invention is that a channel member receives a roller to support the one panel end during translatory movement between the closed and partially open positions and the roller moves out of the channel member through an open end thereof during pivotal movement of the panel to the fully open position.

BRIEF DESCRIPTION OF THE DRAWINGS

The above detailed features and other features of this inventon are apparent from the following description of the preferred embodiment and the drawings in which.

DESCRIPTION OF THE PREFERRED EMBODIMENT

Figure 1:
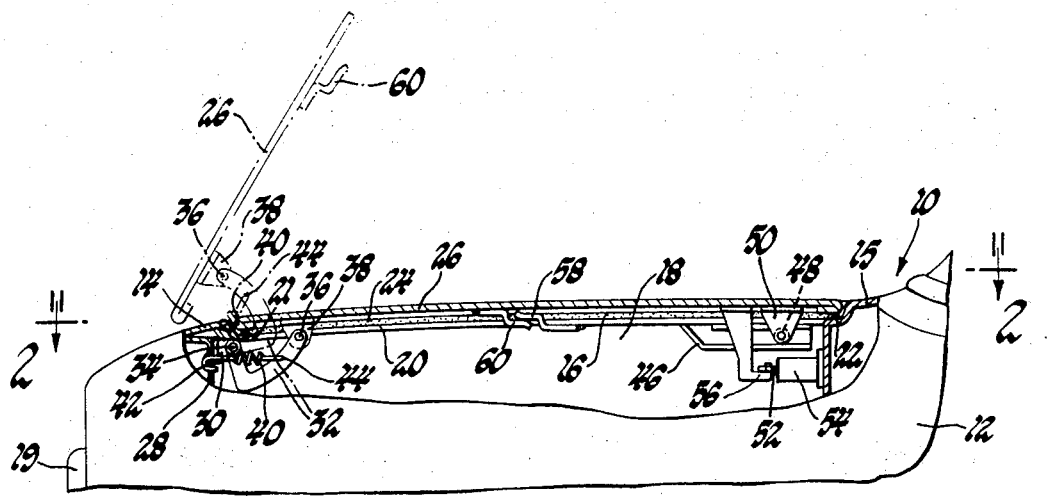
FIG. 1 is a side elevation view of a portion of a vehicle body partially broken away to show a mounting arrangement, according to this invention, for supporting a compartment panel which is shown in a solid line indicated closed position and a phantom line indicated fully open position.

Referring to the drawings, a vehicle body is generally indicated by 10 and includes front fenders or panels 12, a fixed front cross panel 14, and a rear cowl or panel 15 that cooperatively define an upwardly oriented opening 16 to a vehicle body compartment 18 located rearward of a front bumper 19. The panels 12, 14, and 15 include respective flanges 20, 21, and 22 for supporting a conventional seal adjacent the edges of opening 16. The edges of a vehicle front hood or compartment panel 26 engage the seal 24 in the solid line indicated closed position of FIG. 1 to thus close the compartment opening.

Figure 3:
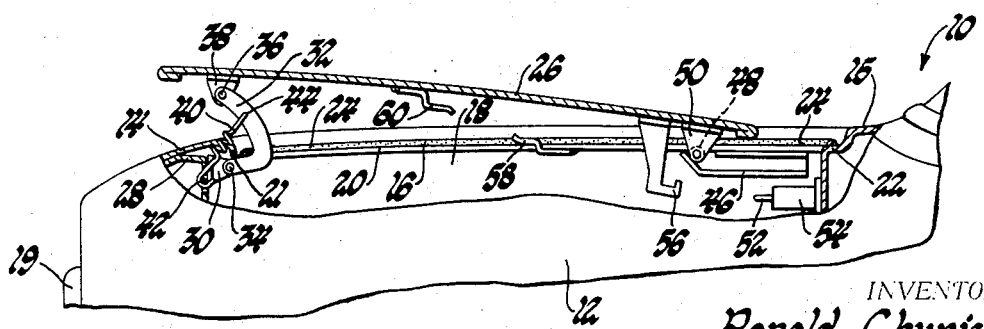
FIG. 3 is a view similar to FIG. 1 showing the panel after translatory movement from the closed position to a partially open position.

A mounting arrangement, according to this invention, for supporting the right-hand side of panel 26 on vehicle body 10 will now be described with the understanding that a symmetrical arrangement supports the left-hand side of the panel and, as such, will not be further described. Adjacent the forward end of compartment 18, a vehicle body cross member 28 supports a bracket 30 to which is pivoted one end of a gooseneck link 32 by a pin 34. A pin 36 pivots the other end of link 32 to a bracket 38 suitably mounted on the forward portion of panel 26. A helical spring 40 has one end 42 secured to member 28 slightly below and forward of pin 34 and another end 44 secured to an intermediate portion of link 32 between pins 34 and 36. Spring 40 is positioned below pin 34 such that link 32 is biased clockwise about this pivotal axis when the panel 26 is in the FIG. 1 solid line indicated closed position and thus tends to exert a downward force maintaining the panel in this position. When the panel 26 is translated to the FIG. 3 partially open position, as will be described, spring 40 moves above the center of pin 34 such that link 32 is biased counterclockwise about this pivotal axis into engagement with the flange 21 of panel 14 to thus position the link.

A channel member 46 is suitably mounted on the vehicle body adjacent the rear end of compartment opening 16 and extends longitudinally relative to the vehicle body. A roller 48 is supported by a bracket 50 suitably mounted on the rear end of panel 26. When the panel 26 is in the FIG. 1 solid line indicated closed position, roller 48 is positioned generally adjacent the rear end of channel member 46 and a bolt 52 of a conventional latch mechanism 54 engages a panel mounted keeper 56 to prevent forward movement of the panel. Vehicle body and panel mounted locking elements 58 and 60 adjacent an intermediate longitudinal positon of opening 16 are slidingly interengaged to cooperate with the channel member 46 and roller 48 in preventing upward movement of the panel from the closed position.

Figure 2:
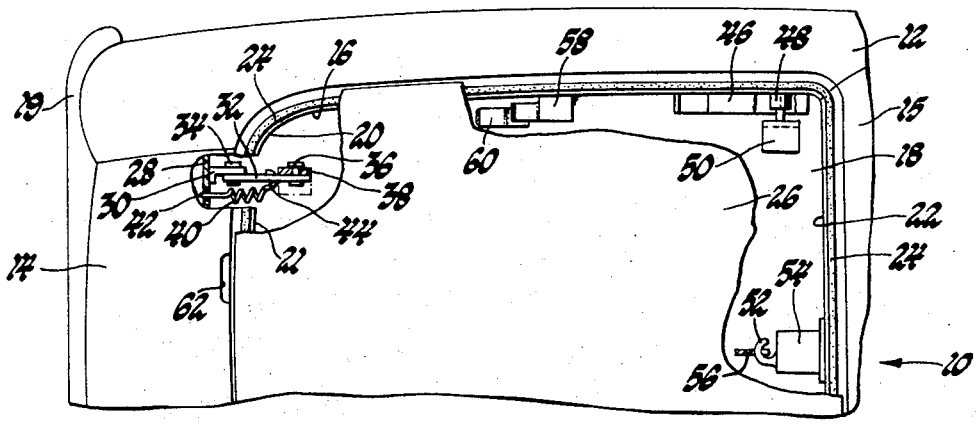
FIG. 2 is a top plan view taken generally along line 2—2 of FIG. 1.

To move the panel 26 from the FIG. 1 solid line indicated closed position to the phantom line indicated fully open position, an occupant first unlatches the latch mechanism 54 to free keeper 56 from bolt and then grasps the forward end of panel 26 adjacent a depression 62 in the rear side of panel 14, see FIG. 2. An upward force applied to panel 26 then moves the forward panel edge slightly upwardly as link 32 pivots counterclockwise about pin 34 and roller 48 slides forwardly along channel member 46, the net effect being to move the panel forwardly in a generally translatory manner to the FIG. 3 partially open position. The roller 48 is positioned adjacent the upwardly opening forward end of channel member 46 when the panel 26 is in this partially open position and moves out of the channel member as the main portion of the panel is pivoted upwardly about pin 36 to the FIG. 1 phantom line indicated fully open position. During this pivotal opening movement, the forward edge of panel 26 pivots downwardly about pin 36 and is unobstructed by any vehicle body member due to the positioning of this pin above panels 12 and 14 during this movement. A suitable hold-open mechanism, not shown, selectively maintains the panel 26 in the fully open position. This hold-up mechanism may include a rod pivoted to the vehicle body or the panel and selectively movable to a position extending therebetween in a conventional manner to maintain the pannel in the fully open position.

The closing movement of the panel 26 is a reverse of the steps of the opening movement and, as such, will not be further described.

The invention thus provides an improved mounting arrangement for a vehicle body compartment panel.

I claim:

1. In combination with a vehicle body including a compartment opening and a closure member therefor, a mounting arrangement for the closure member comprising, slide means between the closure member and the vehicle body adjacent one end of the compartment opening, connecting means having a portion pivoted to the closure member adjacent a second end of the compartment opening opposite the one end, means for supporting the connecting means on the vehicle body for movement between first and second positions to cooperate with the slide means in mounting the closure member for generally translatory movement between a closed position and a partially open position where the closure member is positioned above the vehicle body adjacent the second end of the compartment opening, the pivotal axis between the connecting means and the closure member being located above the adjacent confines of the vehicle body when the closure member is in the partially open position and the closure member being movable about this axis, while constantly located within the horizontal confines of the vehicle body, between the partially open position and a fully open position, and control means extending between the connecting means and the vehicle body so as to selectively and alternately bias the connecting means to either the first position where the closure member is in closed position or the second position where the closure member is in the partially open position or the fully open position.

2. In combination with a vehicle body including a compartment opening and a closure member therefor, a mounting arrangement for the closure member comprising, slide means between the closure member and the vehicle body adjacent one end of the compartment opening, linkage means having portions respectively pivoted to the closure member and the vehicle body generally adjacent a second end of the compartment opening opposite the one end, the linkage means being movable about the vehicle body pivotal axis between first and second positions to cooperate with the slide means in mounting the closure member for generally translatory movement between a closed position and a partially open position where the closure member is positioned above the vehicle body adjacent the second end of the compartment opening, the pivotal axis between the linkage means and the closure member being located above the adjacent confines of the vehicle body when the closure member is in the partially open position and the closure member being movable about this axis, while constantly located within the horizontal confines of the vehicle body, between the partially open position and a fully open position, and control means extending between the linkage means and the vehicle body so as to selectively and alternately bias the linkage means to either the first position where the closure member is in closed position or the second position where the closure member is in the partially open position or the fully open position.

3. In combination with a vehicle body including a body member defining a compartment opening and a closure member therefor, a mounting arrangement for the closure member comprising, roller means mounted on one of the members, elongated channel means mounted on the other member and receiving the roller means adjacent one end of the compartment opening to slidably support the adjacent end of the closure member, a link with one end pivoted to the vehicle body and a second end pivoted to the closure member about respective transverse vehicle body axes adjacent a second end of the compartment opening opposite the one end, the link being pivotally movable about the one link end between first and second positions to cooperate with the roller means and channel means in mounting the closure member for generally translatory movement between a closed position and a partially open position where the pivotal axis of the second link end and the adjacent portion of the closure member are located above the vehicle body member adjacent the second end of the compartment opening, the closure member being pivotally movable about the pivotal axis of the second link end between the partially open position and a fully open position, and spring means extending between the vehicle body and the link and moving overcenter of the pivotal axis of the one link end to selectively and alternately maintain the link in either the first or second position.

4. In combination with a vehicle body including a compartment opening and a closure member therefor, a mounting arrangement for the closure member comprising, roller means mounted on the closure member, channel means mounted on and extending longitudinally of the vehicle body, the channel means receiving the roller means to slidably support the closure member on the vehicle body adjacent one end of the compartment opening, a gooseneck link with first and second ends respectively pivoted to the vehicle body and the closure member about respective transverse vehicle body axes adjacent a second end of the compartment opening opposite the one end, the link being pivotally movable about the first link end between first and second positions to cooperate with the roller means and channel means in mounting the closure member for generally translatory movement between a closed position and a partially open position where the pivotal axis of the second link end and the adjacent portion of the closure member are located above the adjacent confines of the vehicle body, the closure member being pivotally movable about the pivotal axis of the second link end between the partially open position and a fully open position, spring means extending between the vehicle body and an intermediate portion of the link between the link ends and moving overcenter of the pivotal axis of the first link end to selectively and alternately bias the link to either the first or second position, and a plurality of locking elements respectively mounted on the vehicle body and the closure member, the locking elements being slidingly interengageable during translation of the closure member to closed position to prevent opening movement of the closure member relative to the compartment opening in a direction generally normal to the plane of translation.

* * * * *

PO-1050
(5/69)

UNITED STATES PATENT OFFICE
CERTIFICATE OF CORRECTION

Patent No. 3,767,001          Dated October 23, 1973

Inventor(s) Ronald Chupick

It is certified that error appears in the above-identified patent and that said Letters Patent are hereby corrected as shown below:

Change Assignee from "General Electric Corporation" to --General Motors Corporation--. Column 3, line 59, insert --52-- after "bolt".

Signed and sealed this 14th day of May 1974.

(SEAL)
Attest:

EDWARD M.FLETCHER,JR.          C. MARSHALL DANN
Attesting Officer                 Commissioner of Patents